United States Patent [19]

Pezaris et al.

[11] 3,748,966
[45] July 31, 1973

[54] VAPOR ENGINE SPEED CONTROL

[75] Inventors: Constantine D. Pezaris, Nahant; Paul J. Trame, South Hamilton, both of Mass.

[73] Assignee: Thermo Electron Corporation, Waltham, Mass.

[22] Filed: Jan. 6, 1972

[21] Appl. No.: 215,838

[52] U.S. Cl. .............................................. 91/364
[51] Int. Cl. ........................................... F15b 13/16
[58] Field of Search ................ 91/364, 435, 363 R; 318/685

[56] References Cited
UNITED STATES PATENTS

| | | | |
|---|---|---|---|
| 3,390,614 | 7/1968 | Tatum.................................. | 91/364 |
| 3,410,177 | 11/1968 | Roess et al............................ | 91/364 |
| 3,644,815 | 2/1972 | Falk..................................... | 318/685 |
| 3,664,234 | 5/1972 | Simons et al........................ | 91/363 R |

*Primary Examiner*—Paul E. Maslousky
*Attorney*—James L. Neal

[57] ABSTRACT

In the speed control system disclosed herein, the throttle valve controlling the admission of vapor under pressure to an expander is operated by a stepping motor. A tachometer signal responsive to expander speed is compared with a reference signal to obtain an error signal. The amplitude of the error signal relative to a reference potential controls a pulse generator which drives the stepping motor at a rate corresponding to the deviation of the expander speed from that desired, while the polarity of the error signal controls the direction in which the stepping motor is driven.

7 Claims, 1 Drawing Figure

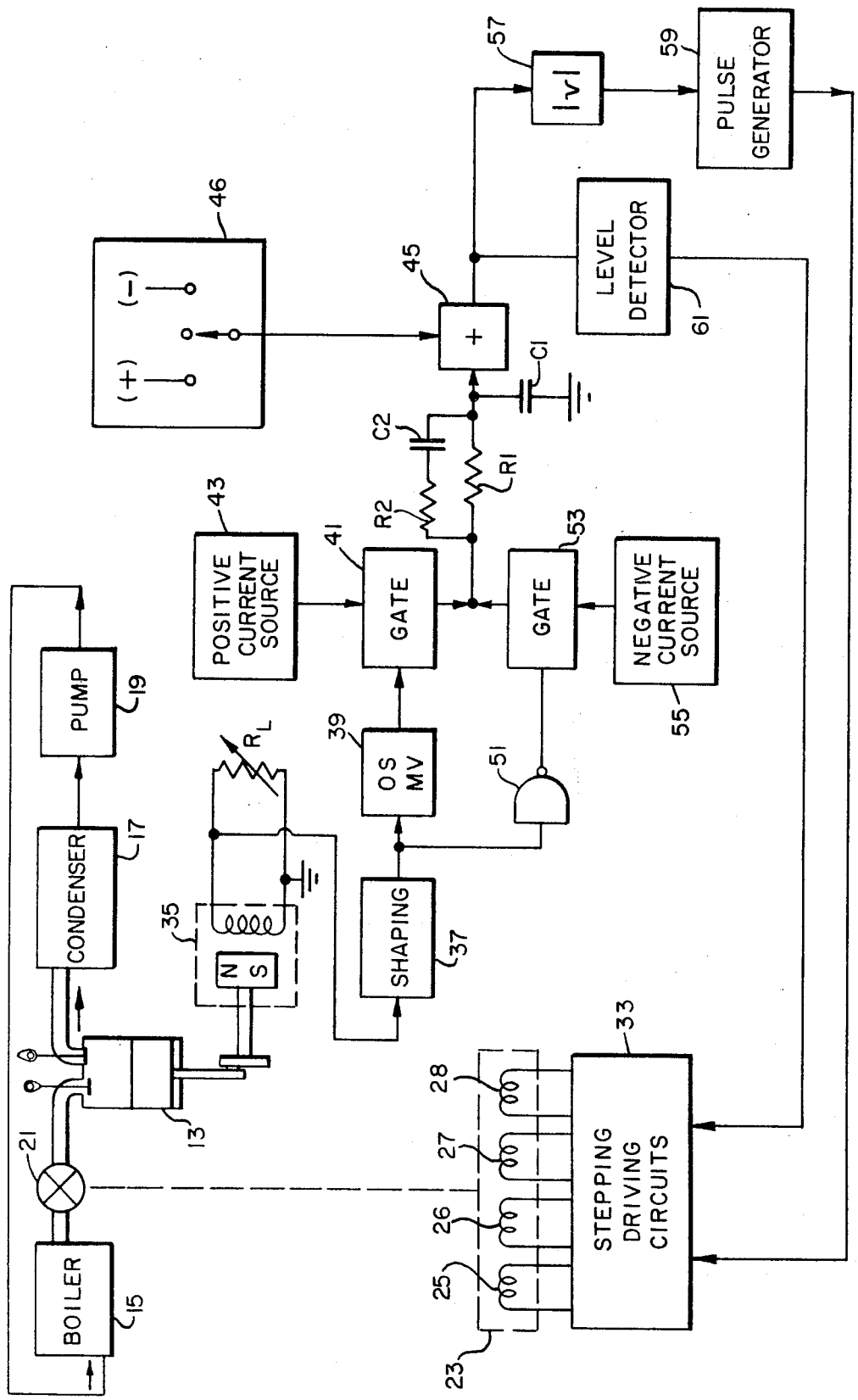

VAPOR ENGINE SPEED CONTROL

BACKGROUND OF THE INVENTION

This invention relates to a speed control system for a vapor engine and more particularly to such a system in which the throttle valve of the vapor engine is controlled by a stepper motor operated in an error-correcting servo loop.

While various throttle control systems have been proposed for operating a vapor engine, these systems have typically been relatively conventional proportional controllers, that is, the output from the control system, i.e. throttle setting, was proportional to the deviation from a desired speed or output level. In accordance with the present invention, the throttle valve in a vapor engine system is controlled by a stepping motor, that is, an electric motor which is responsive to a pulsed electric signal and moves in discrete increments and which holds or remains in an existing position in the absence of any input signal. In the usual mode of operation of such motors, an open loop control system is employed in which the motor is advanced to a given position by the application of a predetermined number of pulses which produces a given movement from the previously existing position.

Among the objects of the present invention may be noted the provision of a speed control system for a vapor engine which provides precise speed control; which has a relatively rapid response to changes in load and/or operating conditions; the provision of such a system which operates in a servo loop mode to minimize speed error; the provision of such a system which is highly reliable and which is of relatively simple and inexpensive construction. Other objects and features will be in part apparent and in part pointed out hereinafter.

SUMMARY OF THE INVENTION

Briefly, the control system of the present invention is adapted to operate the throttle valve controlling the application of vapor under pressure to an expander so as to maintain the speed of the expander at a preselected level. A stepping motor provides the motive force for actually positioning the valve. In the control circuitry for the stepping motor, a tachometer signal is employed in generating an error signal which represents the deviation of the expander speed from the desired speed. The amplitude of the error signal relative to a reference potential controls a pulse generator providing to the stepping motor a pulse signal having a frequency which varies as a function of the difference between the error signal amplitude and the reference potential while the sense or polarity of the error signal relative to the reference potential is employed to control the direction in which the stepper motor is driven by the pulse signal.

BRIEF DESCRIPTION OF THE DRAWING

The single drawing is a diagrammatic illustration of a vapor engine system together with a block diagram of a speed control system constructed in accordance with the present invention.

DESCRIPTION OF THE PREFERRED EMBODIMENT

Referring now to the drawing, a vapor engine system is indicated generally at 11. The major components of the engine system include a reciprocating expander 13, a boiler 15 for providing vapor under pressure to drive the expander, and a condenser 17 for restoring the expanded vapor to a liquid phase. The engine system also includes a feed pump 19 for returning condensed working fluid to the boiler 15 and a throttle valve 21 for controlling the admission of vapor under pressure from the boiler 15 to the expander 13. The mechanical construction of the valve 21 is preferably of the general type disclosed in the copending and co-assigned application of Tom LeFeuvre entitled Throttle Valve which is being executed of even date herewith. In that valve construction, a valve stem is adapted to be positioned, through a ball nut assembly, by means of a stepping motor of conventional construction. Such a stepping motor is indicated at 23 in the present drawing.

As is conventional, motor 23 employs four windings 25-28, two of which are utilized in providing movement in one direction with the remaining two being utilized to produce movement in the opposite direction. As is understood, the pair of windings being utilized at any given time are typically energized by means of squarewave signals which are applied in an overlapping or phase quadrature relationship. Such phasing produces a rotating field which increments the motor armature. Conventional circuitry for generating such quadrature squarewave signals is indicated generally at 33 but this circuitry is not described in detail as being well known in the art. It may be noted in passing, however, that such circuitry can be controlled by two input signals, one a pulse signal which sets the rate at which the motor is stepped and, secondly, a d.c. or logic level signal which controls the direction of rotation. Essentially, this latter signal merely causes the quadrature signals to be transferred from one pair of windings to the other pair of windings so as to reverse the rotation of the motor.

In the embodiment illustrated, the vapor engine system 11 is employed to drive an alternator 35 for generating electric power. In the drawing, alternator 35 is connected to a load resistance $R_L$ which is indicated as being variable. In such a generator application, it is typically desired to maintain the alternator output frequency at a constant preselected level in spite of variations in loading, etc. As will be understood, other applications may require that the engine be operated at a desired or preselected speed which is variable. An example of such an application is in an automotive vehicle.

In the embodiment illustrated, the a.c. voltage generated by the alternator 35 is itself taken as a tachometer signal. This signal is applied to a shaping circuit 37 which provides a squarewave tachometer signal which is in synchronism with the a.c. output of the alternator. The duration of each tachometer squarewave pulse is inversely proportional to the a.c. frequency. It should be understood that, while this squarewave signal may be of the same frequency as the a.c. power voltage, it may also be a different frequency rationally related to the alternator output frequency. As should also be understood, a separate tachometer signal generator could also be employed and such a generator might be employed as a redundant output to be used as an alternative to the alternator output.

The squarewave signal provided by the shaping circuit 37 is applied to a one-shot multivibrator circuit 39 to generate a squarewave pulse train signal in which each pulse has a fixed or predetermined duration rather than a duration which varies as a function of the alternator output frequency. These fixed duration pulses provide a predetermined time base against which the variable duration squarewave associated with the alternator signal is compared.

The squarewave pulse train provided by the one-shot multivibrator 39 is applied to a gate circuit 41 which controls the flow of current from a positive source 43, through a resistor R1, into a capacitor C1. This capacitor provides an integrating function as described hereinafter. The variable width squarewave pulse signal obtained from the shaping circuit 37 is applied, through an inverter 51, to a gate circuit 53 which in turn controls the flow of current from a negative source, indicated at 55, into the same capacitor. The resistor R1 is shunted by a high-pass network comprising resistor R2 and capacitor C2 for a purpose described hereinafter.

The pulse duration provided by the one-shot multivibrator 39 is selected in relation to the values of the currents provided by the positive and negative sources and also in relationship to the nominal pulse duration obtained from the shaping circuit 37 so that the positive and negative current flows are exactly balanced when the alternator is operating exactly at the desired frequency. In this case, the voltage on the capacitor C1 will, on the average over many cycles, not change. However, if the vapor engine speed is slightly higher than desired, the durations of the squarewave pulses obtained from the shaping circuit will be slightly shorter than the nominal value and there will be a net positive current flow into the capacitor C1 causing its voltage to rise. Conversely, if the alternator is operated at less than the desired speed, the squarewave tachometer signal will be slightly longer than the nominal value and there will be a net negative current flow with respect to the capacitor C1 so that the voltage on the capacitor will fall.

As will be understood by those skilled in the art, the voltage on the capacitor C1 thus constitutes an error signal which varies mainly as a function of the deviation of the alternator speed from the desired speed. In other words, the deviation of the d.c. or equilibrium voltage on the capacitor C1 from a desired reference potential represents deviation of the alternated speed from the desired speed. In the embodiment illustrated, the reference level is assumed to be ground for convenience of description but it should be understood that other reference levels could also be readily employed. While the current signals are described as being applied simultaneously, it should be understood that they could also be applied alternately since it is the integrated value of the current flow which determines the error signal value.

The voltage on capacitor C1 is applied, through an adder 45, to a circuit indicated at 57 which provides a signal, designated the deviation signal, proportional to the absolute value of the deviation of the error signal from the reference level. In the drawing, this function has been indicated by $v$ since when the error signal is measured with respect to ground, the value of the deviation signal is proportional to the absolute value of the voltage on the capacitor. This deviation signal controls a pulse generator 59 which operates to generate pulses at a frequency which varies as a function of the amplitude control voltage applied thereto. This pulse generator may thus be considered to be a voltage to frequency converter. The pulse signal provided by the pulse generator 59 is in turn provided to the stepper driving circuits 33 described previously as the signal which determines the speed at which the stepping motor 23 is operated.

The error signal provided at capacitor C1 is also applied to a level detector 61, e.g. a Shmitt trigger circuit, to provide a d.c. control signal which indicates whether the error signal from the capacitor C1 is above or below the reference level, in this case ground potential. The d.c. output or logic signal obtained from the level detector 61 is in turn applied to the stepper motor driving circuitry 33 as the signal which controls the direction in which the stepper motor 23 is driven, i.e., in response to the pulse signal applied thereto by the pulse generator 59.

From the foregoing, it will be understood that a servo loop control has been established over the operation of the vapor engine system. Assuming that the directions of control and the gain of the system are appropriately chosen, the valve 21 will be adjusted in a sense tending to correct any existing error in the speed of the alternator 35. However, the control provided differs from the usual type of proportional control exercised in servo loop systems in that it is not the position of the valve 21 which is proportional to the amplitude of the error signal but rather the rate of change of the valve setting is controlled in proportion to the error signal deviation. The purpose of the high-pass network shunting the resistor R1 is to cause the servo loop to respond more strongly to abrupt changes in speed or load. The high-pass network provides this function by causing the error signal to vary as a function of the rate of change of speed as well as to the change or deviation in speed.

If it is desired to provide a variable speed system, this can be accomplished by varying the duty cycle of the one-shot multivibrator 39 since the servo loop control will cause the period of the tachometer signal to vary in proportion.

The adder 45 allows a manual over-ride signal, obtained from a bipolar source circuit indicated at 46, to be applied to the level detector and pulse generator circuits. The magnitude of this signal is selected so that it will overwhelm the error signal and cause the valve to move at its maximum speed in the selected direction. The adder may comprise merely a summing junction.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a vapor engine in which vapor under pressure is admitted through a throttle valve to a reciprocating expander, a system for controlling the operating speed of said expander comprising:
   means including an electric stepping motor for setting said throttle valve;
   means for generating a feedback signal which varies as a function of the speed of said expander;
   means providing a reference signal representing a desired expander speed;
   means for comparing said feedback signal and said reference signal thereby to generate a d.c. error signal which varies with respect to a reference potential as a function of the deviation of the engine speed from the desired speed;

pulse generator means controlled by said error signal for generating a repetitive pulse signal having a pulse repetition rate which is substantially proportional to the magnitude of the difference between said error signal and said reference potential; and switching means for applying said pulse signal to said motor to drive said valve in one direction when said error signal is greater than said reference potential and to drive said valve in the opposite direction when said reference potential is greater than said error signal.

2. In a vapor engine in which vapor under pressure is admitted through a throttle valve to an expander, a system for controlling the operating speed of said expander comprising:

means including an electric stepping motor for setting said throttle valve;

means for generating a pulsatile tachometer signal having a period which varies as a function of the speed of said expander;

means for generating, synchronously with said tachometer signal, a pulsatile reference signal comprising a train of pulses of preselected duration;

pulse generator means for generating a repetitive pulse signal having a pulse repetition rate which is substantially proportional to the magnitude of the difference between said preselected duration and said variable period; and switching means for applying said pulse signal to said motor to drive said valve in one direction when said preselected duration is greater than said variable period and to drive said valve in the opposite direction when said variable period is greater than said preselected period.

3. A system as set forth in claim 2 wherein said means for generating a reference signal includes a one-shot multivibrator triggered by said tachometer signal.

4. A system as set forth in claim 2 wherein said tachometer signal controls a source providing current of one polarity and said reference signal controls a source providing current of opposite polarity and wherein the currents provided by both sources are applied to a capacitor.

5. A system as set forth in claim 4 wherein said switching means includes a level detector responsive to the voltage on said capacitor for selectively reversing said motor.

6. A system as set forth in claim 4 wherein said pulse repetition rate varies as a function of the deviation of the voltage on said capacitor from a predetermined level.

7. In a vapor engine in which vapor under pressure is admitted through a throttle valve to an expander, a system for controlling the operating speed of said expander comprising:

means including an electric stepping motor for setting said throttle valve;

means for generating a pulsatile tachometer signal, having a period which varies as a function of the speed of said expander;

a one-shot multivibrator, triggered by said tachometer signal, for generating a train of pulses of preselected duration synchronously with said tachometer signal;

an integrating capacitor;

means for charging said capacitor as a function of the time difference between each pulse of preselected duration and said variable period thereby to generate a d.c. error signal which varies with respect to a reference potential as a function of the deviation of the engine speed from a desired speed;

pulse generator means for generating a repetitive pulse signal having a pulse repetition rate which is substantially proportional to the magnitude of the difference between said error signal and said reference potential; and switching means responsive to said error signal for controlling said motor to drive said valve in one direction when said error signal is greater than said reference potential and to drive said valve in the opposite direction when said reference potential is greater than said error signal.

* * * * *